(12) United States Patent
Butler et al.

(10) Patent No.: US 10,380,909 B2
(45) Date of Patent: Aug. 13, 2019

(54) INTERACTIVE PHONICS GAME SYSTEM AND METHOD

(71) Applicant: Square Panda, Inc., Sunnyvale, CA (US)

(72) Inventors: Andrew Butler, Sunnyvale, CA (US); F Brian Iannce, San Jose, CA (US); Carey Lee, Redwood City, CA (US); Hector Javier Farias, Castro Valley, CA (US)

(73) Assignee: Square Panda Inc., Sunnyvale, CA (US)

( * ) Notice: Subject to any disclaimer, the term of this patent is extended or adjusted under 35 U.S.C. 154(b) by 0 days.

(21) Appl. No.: 15/428,154

(22) Filed: Feb. 9, 2017

(65) Prior Publication Data

US 2017/0213475 A1     Jul. 27, 2017

Related U.S. Application Data

(63) Continuation-in-part of application No. 14/838,307, filed on Aug. 27, 2015, now abandoned.

(51) Int. Cl.
*A63H 3/36* (2006.01)
*G09B 17/00* (2006.01)
*A63H 17/26* (2006.01)
*G06F 3/0346* (2013.01)
*G09B 5/06* (2006.01)

(52) U.S. Cl.
CPC .......... *G09B 17/003* (2013.01); *A63H 3/36* (2013.01); *A63H 17/26* (2013.01); *G06F 3/0346* (2013.01); *G09B 5/065* (2013.01); *A63H 2200/00* (2013.01)

(58) Field of Classification Search
CPC ..... A63F 13/235; A63F 13/65; A63F 2300/65
See application file for complete search history.

(56) References Cited

U.S. PATENT DOCUMENTS

| | | | | |
|---|---|---|---|---|
| 5,823,782 A | * | 10/1998 | Marcus | G09B 1/06 434/156 |
| 5,853,327 A | | 12/1998 | Gilboa | |
| 6,290,565 B1 | | 9/2001 | Galyean III et al. | |
| 6,394,872 B1 | | 5/2002 | Watanabe et al. | |
| 7,050,754 B1 | * | 5/2006 | Marcus | G09B 1/06 345/156 |
| 8,057,233 B2 | * | 11/2011 | Owen | G09B 5/06 172/176 |
| 8,287,372 B2 | | 10/2012 | Hong et al. | |

(Continued)

OTHER PUBLICATIONS

"U.S. Appl. No. 14/838,307, Non Final Office Action dated Aug. 9, 2016", 13 pgs.

*Primary Examiner* — Jay Trent Liddle
*Assistant Examiner* — Alex F. R. P. Rada, II
(74) *Attorney, Agent, or Firm* — Schwegman Lundberg & Woessner, P.A.

(57) ABSTRACT

A system for encouraging a child to learn to read, comprising a computing device and at least one physical manipulative, wherein the computing device can identify the physical manipulative and display at least one word relating to the physical manipulative. In an embodiment, a letter identification board with letter manipulatives is included, wherein a child can spell out a word on the letter identification board and the computing device shows an animation of the physical manipulative performing the action indicated by the word.

20 Claims, 6 Drawing Sheets

(56) References Cited

U.S. PATENT DOCUMENTS

| | | | |
|---|---|---|---|
| 8,495,133 B2* | 7/2013 | Hoo | G06K 9/00 709/203 |
| 8,926,395 B2 | 1/2015 | Zheng | |
| 2003/0148249 A1* | 8/2003 | Marcus | G09B 1/06 434/156 |
| 2006/0215476 A1* | 9/2006 | Owen | G09B 1/34 365/230.03 |
| 2009/0137185 A1 | 5/2009 | Zheng | |
| 2011/0016173 A1* | 1/2011 | Hoo | G06K 9/00 709/203 |
| 2012/0295704 A1 | 11/2012 | Reiche | |
| 2013/0165223 A1* | 6/2013 | Leyland | A63F 13/02 463/30 |
| 2013/0296058 A1* | 11/2013 | Leyland | A63F 13/95 463/42 |
| 2013/0303047 A1 | 11/2013 | Albert et al. | |
| 2014/0030955 A1 | 1/2014 | Smetanin | |
| 2014/0162785 A1 | 6/2014 | Reiche | |
| 2014/0273717 A1 | 9/2014 | Judkins et al. | |
| 2014/0274313 A1 | 9/2014 | Bala | |
| 2014/0364240 A1* | 12/2014 | Leyland | A63H 3/003 463/43 |
| 2015/0065258 A1 | 3/2015 | Meade | |
| 2015/0087427 A1 | 3/2015 | Wane | |
| 2016/0184724 A1 | 6/2016 | Butler | |

\* cited by examiner

INTERACTIVE PHONICS GAME SYSTEM AND METHOD

CROSS-REFERENCE TO RELATED APPLICATIONS

The present application is a continuation in part of U.S. application Ser. No. 14/838,307, filed Aug. 27, 2015, which is herein incorporated by reference.

BACKGROUND

Field of the Invention

The present invention is generally in the area of educational toys for children, and specifically relates to a system and method of teaching phonics involving physical manipulatives as well as software.

Description of Related Art

Children learning to read are often encouraged to use phonics to "sound out" letters in a word. This helps the child understand the sounds made by different letters and thus assimilate the rules of English spelling and pronunciation. Since children are physical learners and respond well to tactile stimulation, many manipulatives exist for the purpose of teaching reading—alphabet blocks, letter-shaped magnets, and other similar things. A child using such toys can learn the shape of the letters by touch as well as by sight and thus learn them better.

Many software games exist for the purpose of teaching children to read, but as mentioned, for optimal learning, it is desirable for such a software game to interact with a system involving physical manipulatives. A need therefore exists for a system that can interact with manipulatives, identify them, and communicate this information to a computing device.

SUMMARY OF THE INVENTION

An object of the present invention is to provide a system for identifying toy manipulatives, communicating the identification information to a computing device, and using it to instruct the child in reading.

Another object of the present invention is to provide an educational toy that combines physical manipulatives with a software game.

The system of the present invention comprises at least one physical manipulative; a computing device comprising a display, a user interface, an identification module for identifying the at least one physical manipulative, and a communication module for communicating with a server; and a server comprising a database wherein the database comprises a listing of physical manipulative and at least one descriptive attribute for each physical manipulative. The computing device is configured to identify the physical manipulative and to display or modify at least one word related to the physical manipulative on the display.

In an embodiment, the system also comprises a set of letter manipulatives, a letter identification board on which the letter manipulatives are placed, an identification module for identifying the letter manipulatives that are placed on the letter identification board. The computing device is further configured to identify any letter manipulatives placed on the letter identification board and identify a word spelled out by the letter manipulatives.

The physical manipulatives can be animal figures, cartoon characters, dolls, action figures, or vehicles.

The descriptive attributes can be personality, habits, sounds, phrases, geographic origin, size, diet, spelling of a name, pronunciation of a name, at least one Internet link. The at least one word may be related to the at least one descriptive attributes.

The identification module may comprise a camera, a NFC module, a QR reader, a bar code reader, a RF receiver, or a sound detection device.

The computing device may also be configured to detect a motion pattern of the physical manipulative and display at least one word related to the motion pattern on the display.

The computing device may also be configured to identify at least one word spelled out by the letter manipulatives. If the at least one word relates to an action, the computing device displays an animation showing the physical manipulative performing the action; if the at least one word relates to an orientation, the computing device displays the physical manipulative in that orientation; if the at least one word relates to a position, the computing device displays the physical manipulative in the position.

The computing device may also be configured to detect the orientation of the physical manipulative and display at least one word relating to the orientation on the display.

The computing device may be a tablet, laptop, smartphone, desktop, or a wearable computing device such as smart glasses.

In an embodiment, there are two physical manipulatives. The computing device is further configured to detect their relative position, the absolute position of each physical manipulative, or the orientation of each physical manipulative, and display at least one word relating to the interaction between the two physical manipulatives.

In an embodiment, there are two physical manipulatives, and the computing device is further configured to identify at least one word spelled out by the letter manipulatives, and if the at least one word relates to the relationship between the two physical manipulative, the computing device displays an animation showing the relationship between the two physical manipulatives.

The method of the present invention comprises detecting the presence of at least one physical manipulative near a computing device, identifying the physical manipulative, and using the computing device to display at least one word relating to the physical manipulative.

In an embodiment, the method of the present invention further comprises detecting the presence of at least one letter manipulative on a letter identification board, identifying each letter manipulative, identifying a word spelled out by the at least one letter manipulative, and if the word relates to an action, using the computing device to display an animation of the physical manipulative performing the action; if the word relates to an orientation, using the computing device to display the physical manipulative in the orientation; and if the word relates to a position, using the computing device to display the physical manipulative in the position.

In an embodiment, the method of the present invention further comprises detecting a motion pattern of the physical manipulative near the computing device and using the computing device to display at least one word relating to the physical manipulative and the motion pattern.

In an embodiment, the method of the present invention further comprises detecting the presence of a second physical manipulative near the computing device, using the computing device to identify any relationship between the physical manipulative and the second physical manipulative, and using the computing device to display at least one word relating to the relationship between the physical manipulative and the second physical manipulative.

In an embodiment, the method of the present invention further comprises detecting the presence of a second physical manipulative near the computing device, detecting the presence of at least one letter manipulative on a letter identification board, identifying each letter manipulative, identifying a word spelled out by the at least one letter manipulative, and if the word relates to a relationship, using the computing device to display the physical manipulative and the second physical manipulative in the relationship.

In an embodiment, the method further comprises identifying at least one descriptive attribute pertaining to the physical manipulative, such as personality, habits, sounds, phrases, geographic origin, size, diet, spelling or pronunciation of a name, or link to the Internet, and displaying at least one word pertaining to the at least one descriptive attribute.

In an embodiment, the at least one physical manipulative is a doll, an animal figure, a cartoon character figure, an action figure, a vehicle.

The step of identifying the at least one physical manipulative may be performed by a QR reader, a bar code reader, a camera, a NFC reader, a RF receiver, or a sound detection device.

LIST OF FIGURES

DETAILED DESCRIPTION

Several embodiments of the present invention are described below. It will be understood that the invention is not limited to these embodiments, but is only limited by the appended claims.

While any computing device may be used to implement the present invention, assuming it has sufficient computing power to identify a physical manipulative and to display animations on the screen, a tablet is used in the preferred embodiment. It will be understood, however, that any laptop, smartphone, desktop computer, or gaming device may also be used to implement the present invention. Wearable computing devices comprising head-mounted displays may also be used. For simplicity, the word "tablet" will be used in the below disclosure to describe the computing device.

Figure 1:
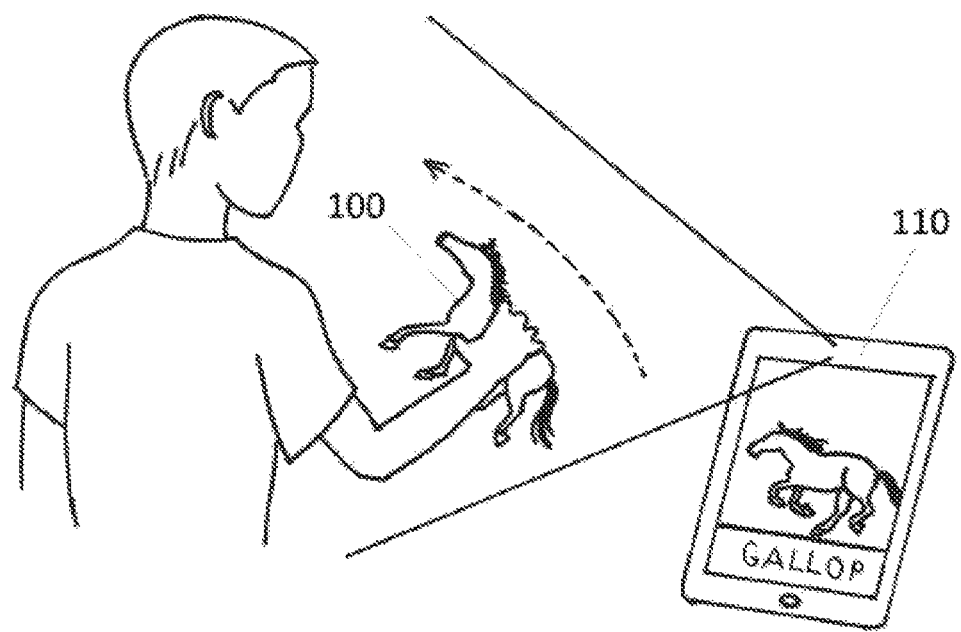
FIG. 1 shows an embodiment of the present invention.

In its preferred embodiment, as shown in FIG. 1, the present invention is implemented on a tablet 110, which comprises a display, a user interface (a touchscreen), a communication module for communicating with a server (via the Internet), and a camera for identifying a physical manipulative. A physical manipulative 100 is moved in front of the tablet 110. The tablet identifies the physical manipulative (preferably visually by using the camera) and displays at least one word relating to the physical manipulative on the screen. For example, it can display the word HORSE if a horse physical manipulative is displayed.

In an embodiment, the tablet 110 is programmed to identify the motion pattern of the physical manipulative 100 as well. This embodiment is shown in FIG. 1. If the horse physical manipulative 100 is moved as if it were galloping, the tablet displays the word GALLOP. This enables a child to learn a new word, to learn how it is spelled, and to learn what it means.

While the physical manipulative 100 is identified visually in the preferred embodiment, it may also be identified by NFC, RFID, sound, a QR pattern, or a bar code. Each physical manipulative may comprise an RFID chip or a QR pattern or a bar code, and a bar code reader, QR reader, NFC module, or RF receiver may be used to identify the physical manipulative.

In an embodiment, the method of identifying the motion of the physical manipulative is different from the method of identifying the physical manipulative itself. So, for example, the tablet's camera can be used to determine how the physical manipulative is moving, while a NFC chip could be used to identify the physical manipulative.

The physical manipulative may be any toy that is easily manipulated by a child. For example, animal figures, stuffed animals, cartoon character figures, dolls, action figures, or vehicles may be used. While it is preferable for the physical manipulative to represent an anthropomorphic character or vehicle such as are commonly used in imaginative play by children, it is not necessarily required. For example, an embodiment of the invention may use blocks.

In the preferred embodiment, the physical manipulative represents a character or an object that has at least one descriptive attribute. For example, a horse is an animal, it goes "Neigh!", it eats grass, it is large, and so on. Such descriptive attributes may be stored in a database and retrieved when a horse manipulative is displayed in front of the computing device. So, rather than displaying the word GALLOP as shown in the Figure, the display may show the word NEIGH or the phrase I EAT GRASS.

Figure 2:
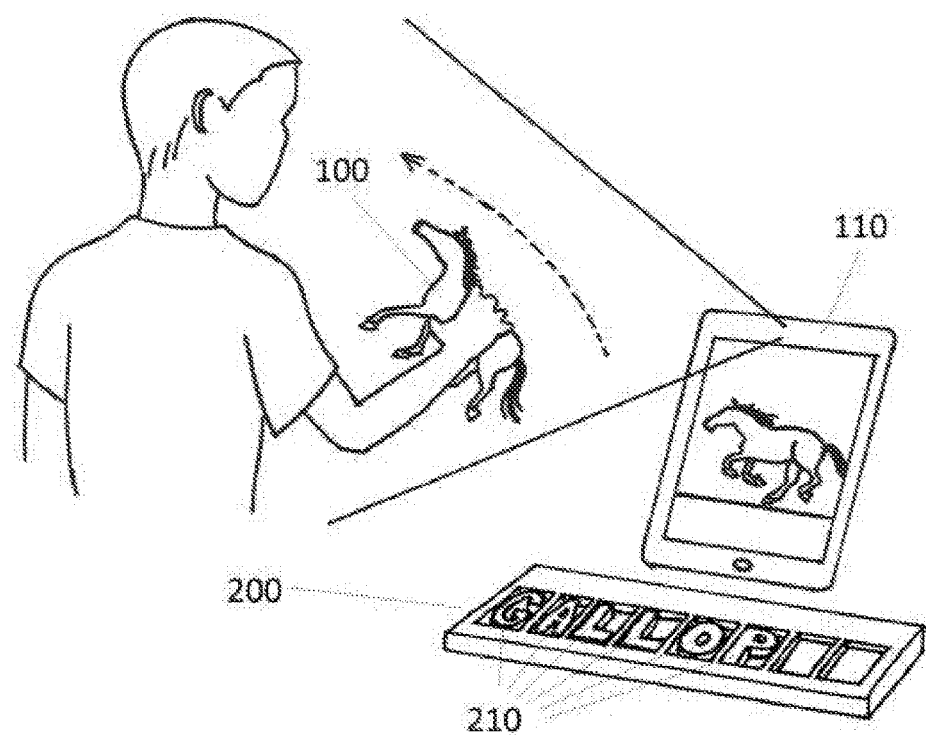
FIG. 2 shows an embodiment of the present invention that also comprises a letter identification board.
Figure 3:
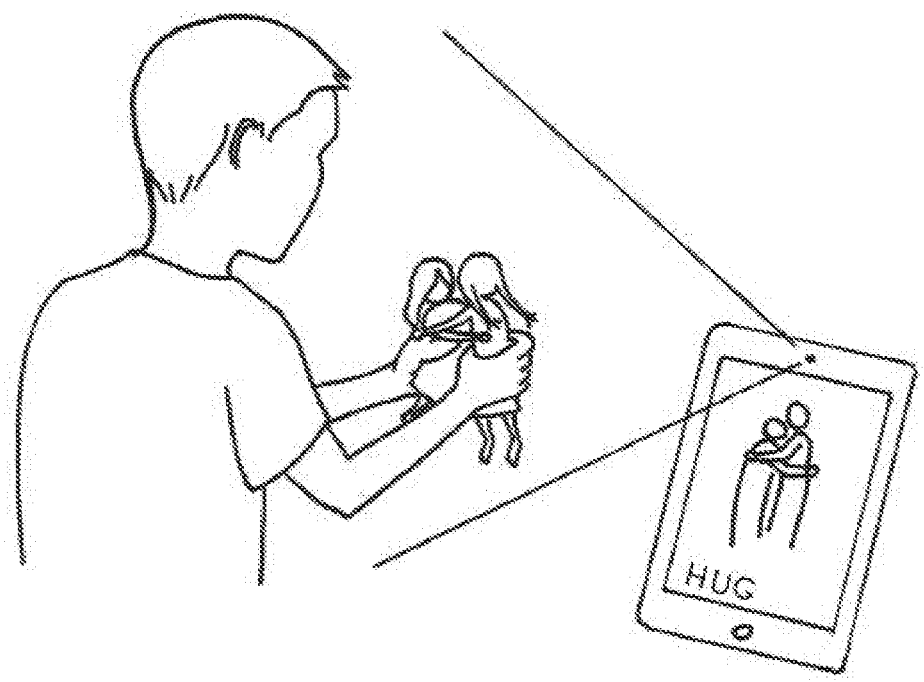
FIG. 3 shows an embodiment of the present invention.
Figure 4:
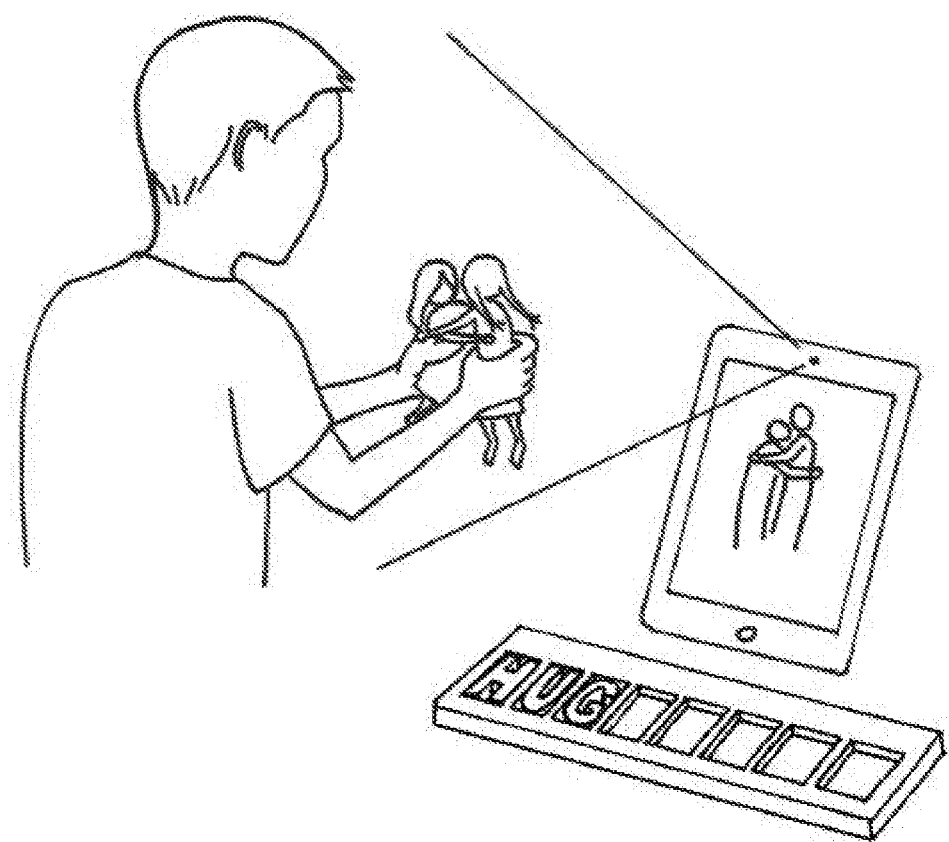
FIG. 4 shows an embodiment of the present invention that also comprises a letter identification board.
Figure 5:
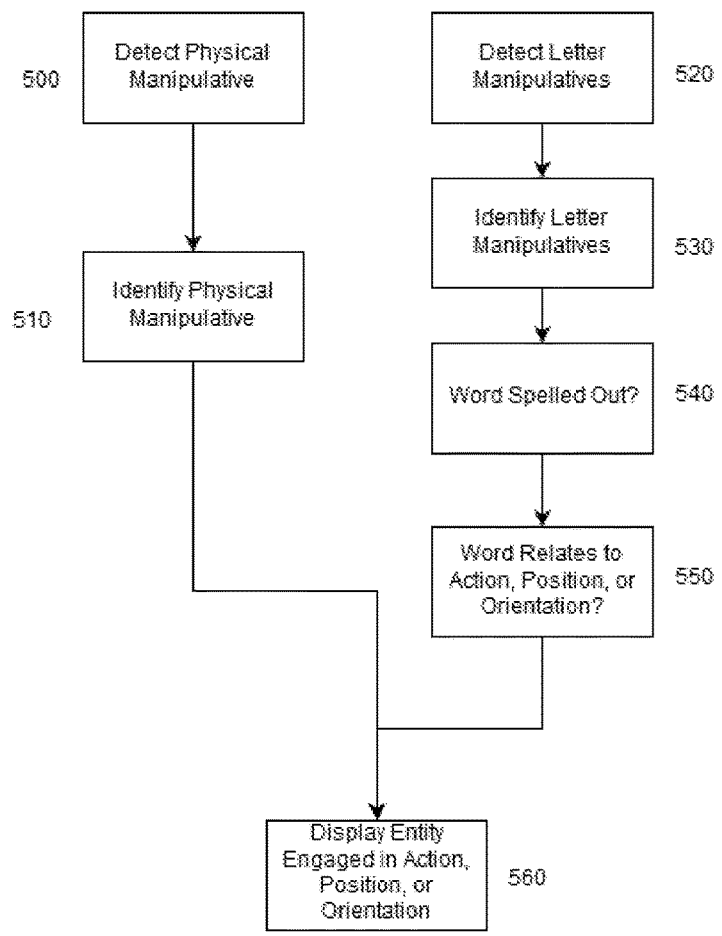
FIG. 5 shows a flowchart of the operation of an embodiment of the present invention.
Figure 6:
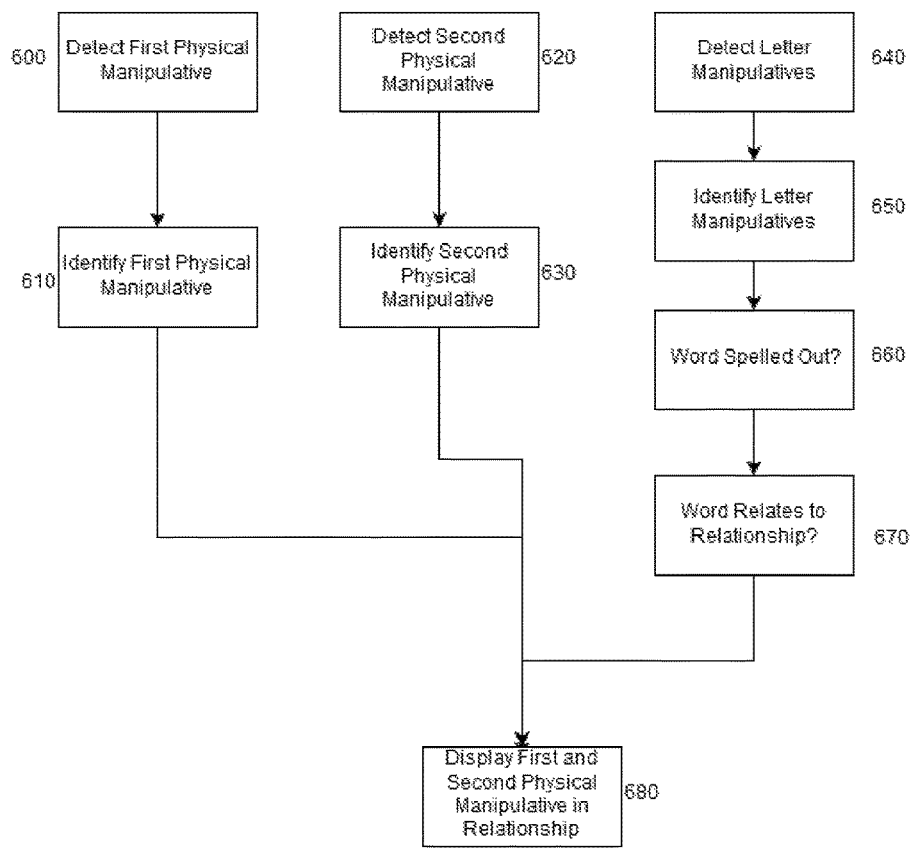
FIG. 6 shows a flowchart of the operation of an embodiment of the present invention.

In an embodiment shown in FIG. 2, a letter identification board 200 and letter manipulatives 210 are connected to the tablet 110. A user may spell out a word (like GALLOP). The letter identification board 200 identifies each letter and communicates the data to the tablet 110; the tablet determines whether or not the letters spell out a word, and if they do, determines whether or not the word can be used to describe an action, a position, an orientation, or a relationship. In the preferred embodiment, this is accomplished by a database comprising lists of "action words", "position words", and so on. For example, "action words" may be words like RUN, WALK, JUMP, TWIRL, GALLOP, TROT, HOP; "position words" may be words like ON TOP, BELOW, ABOVE, LEFT, RIGHT; "relationship words" may be words like HUG, KISS, HIT, CARRY, SIT ON; "orientation words" can be UPSIDE-DOWN, SIDEWAYS, RIGHT SIDE UP, and so on. FIG. 5 shows a flowchart of the operation of this embodiment of the present invention. As can be seen in the Figure, the system detects a physical manipulative 500 and identifies it 510. The system also detects 520 and identifies 530 any letter manipulatives, and determines whether or not a word is spelled out 540. If the word relates to an action, position, or orientation 550, the tablet displays 560 the entity symbolized by the physical manipulative (i.e. a horse, a baby, or a truck) engaged in the action, position, or orientation. FIG. 3 shows an interaction between two physical manipulatives; the two dolls are hugging, so the word HUG is displayed on the screen. In FIG. 4, a letter identification board is used to spell out the word HUG, and two manipulatives are shown in front of the camera; an animation showing the two figures hugging is displayed on the screen. FIG. 6 shows a flowchart of the operation of this embodiment of the present invention. As can be seen in the flowchart, the system detects 600 and identifies 610 the first physical manipulative, and detects 620 and identifies 630 the second physical manipulative (i.e. two dolls). At the same time, the system detects 640 and identifies 650 any letter manipulatives, and determines 660 whether or not they spell out a word. If the word relates to a relationship between two entities (i.e. HUG), the tablet displays 680 the first and second physical manipulatives (or the entities identified by them) engaged in the relationship.

After the word is identified and determined to be an "action word" (or "position word", "relationship word", or "orientation word), the tablet identifies any physical manipulatives present in front of the camera. If a physical manipulative is present in front of the camera, the tablet shows the physical manipulative performing the action. For example, spelling out the word GALLOP on the letter identification board, and displaying a horse manipulative in front of the tablet, will result in an animation of a galloping horse. If the word is not an "action word", the animation will not be displayed.

In an embodiment, if the word is an "action word" but wrong for the particular physical manipulative (i.e. the word GALLOP combined with a frog), the system may display a message that frogs do not gallop, or display a smiley face laughing at the silliness of a galloping frog.

The letter identification board may use any method of identifying the letters present on the board. Capacitive sensors are used in the preferred embodiment, as disclosed in prior application Ser. No. 14/816,536; however, any other sensors may be used.

Exemplary embodiments have been described above. It will, however, be clear to a person of reasonable skill that the invention encompasses other embodiments, which also fall into the scope of the present invention.

The invention claimed is:

1. A system comprising:
   at least one physical manipulative;
   a set of letter manipulatives distinct from the at least one physical manipulative;
   a letter identification board on which letter manipulatives are placed; and
   a computing device comprising:
   a display;
   a user interface;
   an identification module configured to identify the at least one physical manipulative;
   a communication module configured to communicate with a server;
   a server comprising a database, said database comprising:
     a listing of physical manipulatives;
     for each physical manipulative, at least one descriptive attribute; and
   an identification module for identifying which letter manipulatives are placed on the letter identification board;
   wherein the computing device is configured to:
     identify the physical manipulative;
     display or modify at least one word related to the physical manipulative on the display;
     identify one or more letter manipulatives placed on the letter identification board; and
     identify a word spelled out by the one or more letter manipulatives.

2. The system of claim 1, wherein the at least one physical manipulative is one of the following group: an animal figure, a cartoon character figure, a doll, an action figure, a vehicle.

3. The system of claim 1, wherein the computing device is further configured to retrieve at least one descriptive attribute relating to the physical manipulative, wherein the at least one descriptive attribute is at least one of the following group: personality, habits, sounds, phrases, geographic origin, size, diet, spelling of a name, pronunciation of a name, at least one Internet link, and wherein the at least one word is related to the at least one descriptive attribute.

4. The system of claim 1, wherein the identification module comprises at least one of the following: a camera, a NFC module, a QR reader, a bar code reader, a RF receiver, a sound detection device.

5. The system of claim 1, wherein the computing device is further configured to:
   detect a motion pattern of the physical manipulative;
   display at least one word related to the motion pattern on the display.

6. The system of claim 1, wherein the computing device is further configured to:
   identify at least one word spelled out by the letter manipulatives,
   if the at least one word relates to an action, displaying an animation showing the physical manipulative performing the action;
   if the at least one word relates to an orientation, displaying the physical manipulative in the orientation;
   if the at least one word relates to a position, displaying the physical manipulative in the position.

7. The system of claim 1, wherein the computing device is further configured to:
   detect an orientation of the physical manipulative;
   display at least one word relating to the orientation on the display.

8. The system of claim 1, comprising a first physical manipulative and a second physical manipulative, wherein the computing device is further configured to:
   detect one of the following: the relative position of the two physical manipulatives, the absolute position of each physical manipulative, the orientation of each physical manipulative,
   display at least one word relating to the interaction between the first physical manipulative and the second physical manipulative.

9. The system of claim 1, comprising a first physical manipulative and a second physical manipulative, wherein the computing device is further configured to:
   identify at least one word spelled out by the letter manipulatives;
   if the at least one word relates to a relationship between the first physical manipulative and the second physical manipulative, displaying an animation showing the relationship between the first physical manipulative and the second physical manipulative.

10. The system of claim 1, wherein the computing device is one of the following:
    a tablet;
    a smartphone;
    a laptop;
    a desktop;
    a wearable computer.

11. A method comprising:
    detecting the presence of a first physical manipulative near a computing device;
    identifying the first physical manipulative;
    using the computing device to display at least one word relating to the first physical manipulative;

detecting the presence of a second physical manipulative near the computing device;
using the computing device to identify a relationship between the first physical manipulative and the second physical manipulative; and
using the computing device to display at least one word relating to the relationship between the first physical manipulative and the second physical manipulative.

12. The method of claim 11, further comprising:
detecting the presence of at least one letter manipulative on a letter identification board, wherein the letter manipulative is distinct from the physical manipulative;
identifying each letter manipulative;
identifying a word spelled out by the at least one letter manipulative;
if the word relates to an action, using the computing device to display an animation of the physical manipulative performing the action;
if the word relates to an orientation, using the computing device to display the physical manipulative in the orientation;
if the word relates to a position, using the computing device to display the physical manipulative in the position.

13. The method of claim 12, further comprising:
detecting the presence of a second physical manipulative near the computing device;
detecting the presence of at least one letter manipulative on a letter identification board;
identifying each letter manipulative;
identifying a word spelled out by the at least one letter manipulative;
if the word relates to a relationship, using the computing device to display the physical manipulative and the second physical manipulative in the relationship.

14. The method of claim 11, further comprising:
detecting a motion pattern of the physical manipulative near the computing device;
using the computing device to display at least one word relating to the physical manipulative and the motion pattern.

15. The method of claim 11, further comprising identifying at least one descriptive attribute pertaining to the physical manipulative, where the at least one descriptive attribute is at least one of the following group: personality, habits, sounds, phrases, geographic origin, size, diet, spelling of a name, pronunciation of a name, link to the Internet, and displaying at least one word pertaining to the at least one descriptive attribute.

16. The method of claim 11, where the at least one physical manipulative is at least one of the following group: an animal figure, a cartoon character figure, a doll, an action figure, a vehicle.

17. The method of claim 11, wherein the step of identifying the at least one physical manipulative is performed by at least one of the following: a QR reader, a bar code reader, a camera, a NFC reader, a RF receiver, a sound detection device.

18. A system comprising:
a physical manipulative; and
a computing device comprising:
a display;
a user interface,
an identification module configured to identify the physical manipulative; and
a communication module configured to communicate with a database that stores a listing of physical manipulatives and, for each listed physical manipulative, a corresponding descriptive attribute;
wherein the computing device is configured to perform operations comprising:
identifying the physical manipulative;
displaying or modifying a word that corresponds to the physical manipulative on the display;
detecting a motion pattern of the physical manipulative; and
displaying at least one word related to the motion pattern on the display.

19. A system comprising:
a physical manipulative; and
a computing device comprising:
a display;
a user interface;
an identification module configured to identify the physical manipulative; and
a communication module configured to communicate with a database that stores a listing of physical manipulatives and, for each listed physical manipulative, a corresponding descriptive attribute;
wherein the computing device is configured to perform operations comprising:
identifying the physical manipulative; and
displaying or modifying a word that corresponds to the physical manipulative on the display;
detecting an orientation of the physical manipulative; and
displaying at least one word relating to the orientation on the display.

20. A system comprising:
a first physical manipulative and a second physical manipulative; and
a computing device comprising:
a display;
a user interface;
an identification module configured to identify the first and second physical manipulatives; and
a communication module configured to communicate with a database that stores a listing of physical manipulatives and, for each listed physical manipulative, a corresponding descriptive attribute;
wherein the computing device is configured to perform operations comprising:
displaying or modifying a word that corresponds to the first and second physical manipulatives on the display;
detecting at least one of the relative positions of the first and second physical manipulatives, the absolute positions of the first and second physical manipulatives, or the orientations of the first and second physical manipulatives; and
displaying at least one word relating to an interaction between the first physical manipulative and the second physical manipulative.

* * * * *

UNITED STATES PATENT AND TRADEMARK OFFICE
CERTIFICATE OF CORRECTION

PATENT NO. : 10,380,909 B2
APPLICATION NO. : 15/428154
DATED : August 13, 2019
INVENTOR(S) : Butler et al.

Page 1 of 1

It is certified that error appears in the above-identified patent and that said Letters Patent is hereby corrected as shown below:

In the Claims

In Column 6, Lines 21-22, in Claim 6, delete "manipulatives," and insert --manipulatives;-- therefor In Column 6, Line 41, in Claim 8, delete "manipulative," and insert --manipulative;-- therefor In Column 8, Line 1, in Claim 18, delete "interface," and insert --interface;-- therefor Signed and Sealed this
Third Day of November, 2020

Andrei Iancu
*Director of the United States Patent and Trademark Office*